(12) United States Patent
Barreiro

(10) Patent No.: US 7,728,478 B2
(45) Date of Patent: Jun. 1, 2010

(54) ELECTRODYNAMIC MACHINE

(75) Inventor: Manuel Vieira Barreiro, Ellenbrook (AU)

(73) Assignee: Barreiro Motor Company, Pty. Ltd., Perth, Western Australia (AU)

( * ) Notice: Subject to any disclaimer, the term of this patent is extended or adjusted under 35 U.S.C. 154(b) by 0 days.

(21) Appl. No.: 11/508,421

(22) Filed: Aug. 23, 2006

(65) Prior Publication Data

US 2006/0279153 A1 Dec. 14, 2006

Related U.S. Application Data

(63) Continuation of application No. 11/021,427, filed on Dec. 23, 2004, now abandoned, which is a continuation of application No. 10/220,921, filed as application No. PCT/AU00/00778 on Jun. 29, 2000, now abandoned.

(30) Foreign Application Priority Data

Mar. 9, 2000 (AU) .................................... PQ6117

(51) Int. Cl.
*H02K 7/18* (2006.01)
(52) U.S. Cl. ...................... 310/114; 290/1 C
(58) Field of Classification Search ............... 310/103, 310/112–114, 115, 117, 121–122, 128, 139, 310/74; 290/1 C, 30 R, 44, 55; 29/1 A, 1 C, 29/4 R, 30 A, 30 R
See application file for complete search history.

(56) References Cited

U.S. PATENT DOCUMENTS

| 634,979 | A | | 10/1899 | Hedland | |
|---|---|---|---|---|---|
| 1,118,616 | A | * | 11/1914 | Apple | 290/22 |
| 1,143,537 | A | | 6/1915 | Green | |
| 1,620,747 | A | | 3/1927 | Allison | |
| 1,629,206 | A | | 5/1927 | Dollmann | |
| 2,084,612 | A | * | 6/1937 | Engelheart | 310/83 |
| 2,696,585 | A | | 12/1954 | Safford | |
| 2,762,939 | A | | 9/1956 | Hodgson | |
| 3,221,172 | A | * | 11/1965 | Rolison | 290/4 R |
| 3,683,249 | A | * | 8/1972 | Shibata et al. | 318/730 |
| 3,716,732 | A | * | 2/1973 | Tillma | 310/61 |
| 4,021,690 | A | | 5/1977 | Burton | |
| 4,291,233 | A | * | 9/1981 | Kirschbaum | 290/1 C |
| 4,329,593 | A | | 5/1982 | Willmouth | |
| 4,441,043 | A | * | 4/1984 | DeCesare | 310/46 |

(Continued)

FOREIGN PATENT DOCUMENTS

AU PQ4601 12/1999

(Continued)

OTHER PUBLICATIONS

The New Encyclopedia Britannica, vol. 18, 15th Edition, pp. 383-384, 1994.

(Continued)

*Primary Examiner*—Tran N Nguyen
(74) *Attorney, Agent, or Firm*—Merchant & Gould P.C.

(57) ABSTRACT

An electrodynamic machine (10) comprising a first rotor (13) and a second rotor (15). The first and second rotors (13, 15) are adapted to rotate relative to each other, preferably in opposite directions. The electrodynamic machine (10) may operate as an electric generator or as an electric motor.

24 Claims, 14 Drawing Sheets

U.S. PATENT DOCUMENTS

| | | | |
|---|---|---|---|
| 4,755,700 A * | 7/1988 | Yongning et al. | 310/114 |
| 5,063,336 A | 11/1991 | Atlas | |
| 5,262,693 A | 11/1993 | Holka | |
| 5,675,203 A | 10/1997 | Schulze et al. | |
| 5,793,136 A | 8/1998 | Redzic | |
| 5,942,862 A | 8/1999 | Yamada et al. | |
| 6,297,575 B1 * | 10/2001 | Yang | 310/266 |
| 6,304,017 B1 | 10/2001 | Leupold | |
| 6,380,653 B1 * | 4/2002 | Seguchi | 310/112 |
| 6,515,391 B2 | 2/2003 | Whitesell | |
| 6,559,569 B2 * | 5/2003 | Aoshima | 310/112 |
| 6,724,113 B2 | 4/2004 | McVicar | |
| RE38,790 E * | 9/2005 | Maeda et al. | 290/40 C |
| 7,042,128 B2 * | 5/2006 | Zepp et al. | 310/191 |
| 7,109,600 B1 * | 9/2006 | Bywaters et al. | 290/55 |

FOREIGN PATENT DOCUMENTS

| | | |
|---|---|---|
| AU | PQ4700 | 12/1999 |
| EP | 469263 A2 | 2/1992 |
| EP | 0 817 359 | 1/1998 |
| EP | 0 828 340 | 3/1998 |
| FR | 571.937 | 5/1924 |
| FR | 2 465 352 | 3/1981 |
| FR | 2 766 989 | 2/1999 |
| GB | 991 897 | 5/1965 |
| GB | 2 278 242 | 11/1994 |
| WO | WO 89/04081 | 5/1989 |

OTHER PUBLICATIONS

Derwent Abstract Accession No. 99-067404/06 & JP-10-313563 A. Nov. 24, 1998.

Derwent Abstract Accession No. 96-245684/25 & JP 08-098479-A. Apr. 12, 1996.

Derwent Abstract Accession No. 98-445281/38 & RU 2104606 C. Feb. 10, 1998.

Derwent Abstract Accession No. 2000-154082/14 & JP 2000-014081-A. Jan. 14, 2000.

* cited by examiner

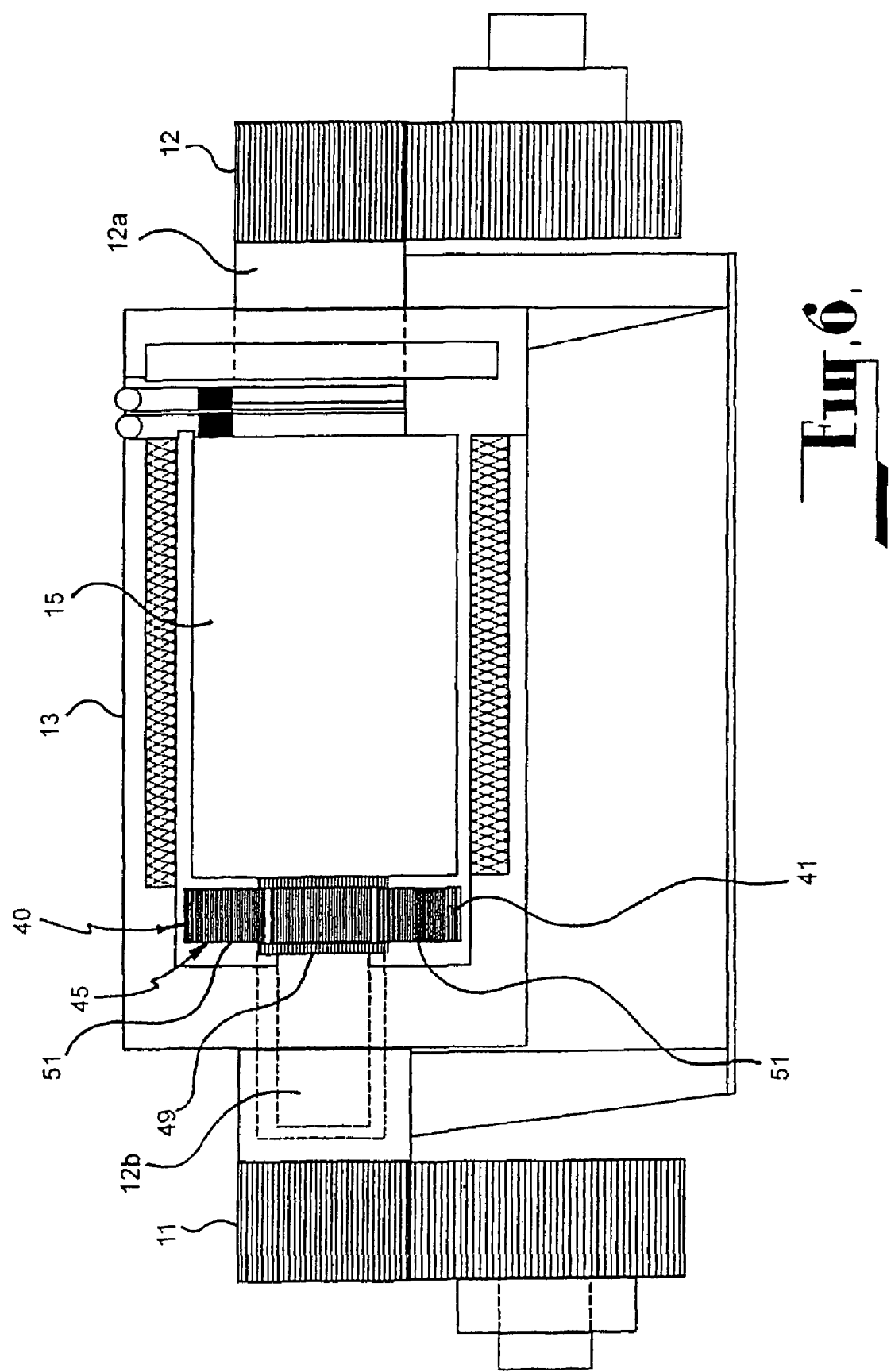

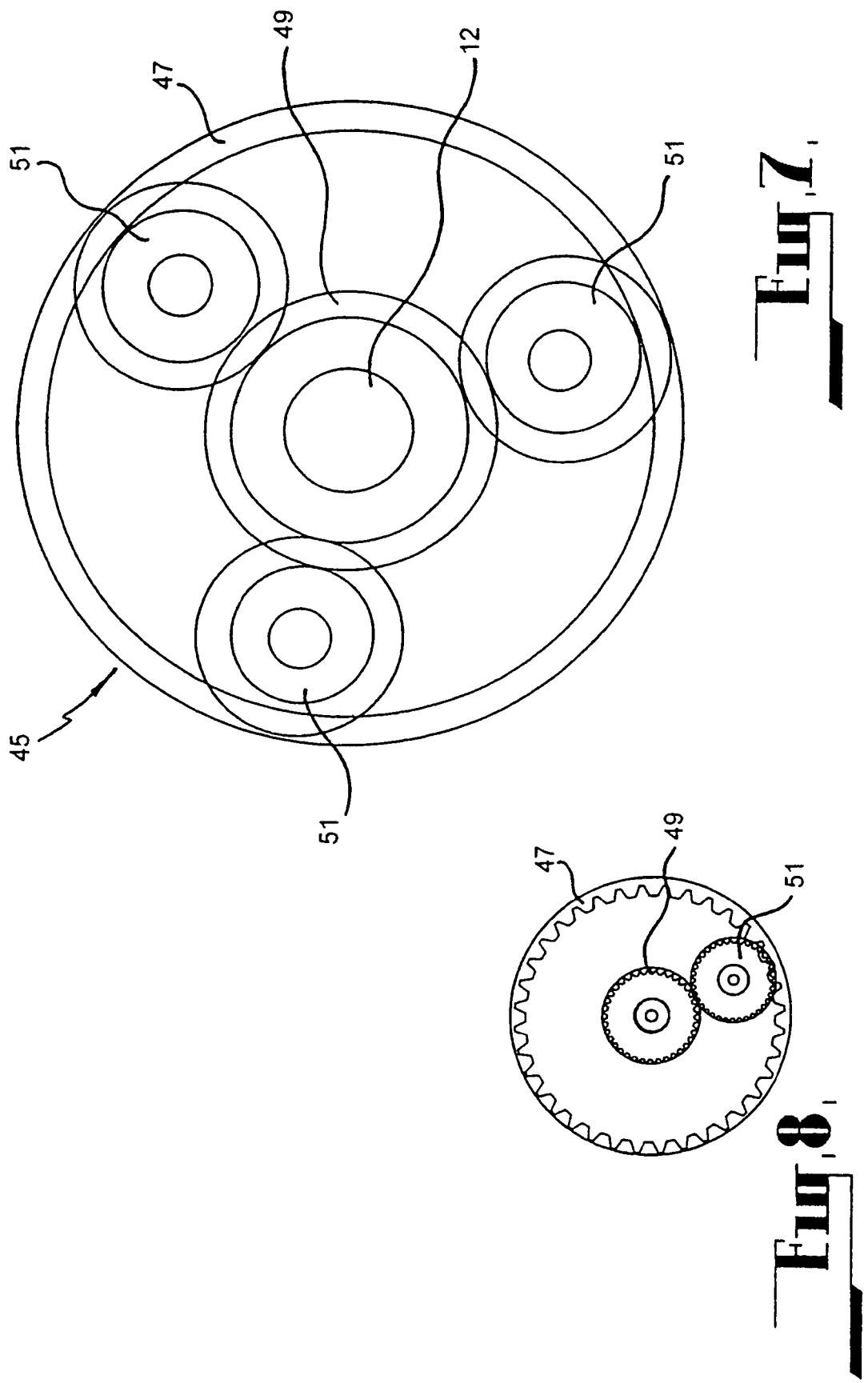

ELECTRODYNAMIC MACHINE

This application is a Continuation of application Ser. No. 11/021,427, filed Dec. 23, 2004, which is a Continuation of application Ser. No. 10/220,921, filed Jan. 2, 2003 and which application(s) are incorporated herein by reference.

TECHNICAL FIELD

This invention relates to an electrodynamic machine such as an electric generator or an electric motor.

BACKGROUND OF THE INVENTION

The invention has been devised as an electrodynamic machine for generating an electrical current, although it may also be used as an electric motor.

Typically, an electrodynamic machine comprises two parts, being a stator and a rotor, one of which incorporates a magnet (which can be either a permanent magnet or an electro-magnet) and the other of which incorporates a conductor. In the case of an electric generator, relative movement between the rotor and the stator generates an electrical current in the conductor. In the case of an electric motor, the passage of an electric current through the conductor induces rotation of the rotor relative to the stator.

SUMMARY OF THE INVENTION

The present invention utilises two parts which rotate relative to each other but neither of those parts is stationary during such relative movement in the sense of a conventional stator.

More particularly, the present invention provides an electrodynamic machine comprising a first rotor mounted on a first shaft, a second rotor mounted on a second shaft, the first and second rotors being adapted to rotate relative to each other, the first and second shafts being in axial alignment with adjacent ends thereof being interconnected to provide mutual support while allowing relative rotation therebetween and a drive means operable to cause rotation of the first rotor and also rotation of the second rotor, with the two rotors rotating relative to each other, the drive means including a drive shaft drivingly connected to both the first rotor and the second rotor.

Typically, the first and second rotors rotate in opposite directions. However, it will be understood that the first and second rotors may alternatively rotate in a common direction but at different rotational speeds so as to provide the relative rotation therebetween.

Where the electrodynamic machine is an electric generator, relative movement between the two rotors generates an electrical current. Typically, one rotor provides a magnetic field which may be established by either a permanent magnet or an electromagnet. The other rotor provides a conductor in which the electric current is generated upon movement of the conductor through the magnetic field. Any suitable structure such as a commutator or a slip ring arrangement may be provided for transferring current from the conductor.

In one arrangement, one rotor may be disposed within the other rotor, with an air gap defined therebetween. In another arrangement, the two rotors may be positioned in an axially spaced relationship with an air gap defined therebetween.

Preferably the second rotor is disposed within the first rotor, and the drive means comprises a drive shaft, a drive pinion connected to the drive shaft for rotation therewith, and first and second driven pinions in meshing engagement with the drive pinion, the first driven pinion being connected to the first rotor for rotation therewith and the second driven pinion being connected to the second shaft to rotation therewith.

A speed control means may be provided to ensure that the two shafts rotate at the same angular velocity but in opposite directions.

The speed control means may comprise a gear mechanism operatively connecting the two shafts. The gear mechanism may comprise an epicyclic gear train in which the internal gear is rigidly connected to one shaft and the sun gear is rigidly connected to the other shaft. In such an arrangement, the internal gear is typically connected to said one shaft by being mounted on the particular rotor associated with that shaft.

The invention also provides an electrical generator comprising a first shaft having a first rotor drivingly connected thereto, a second shaft having a second rotor, drivingly connected thereto, the two rotors co-operating to generate an electrical current upon relative rotation therebetween, the two shafts being interconnected in a manner to provide mutual lateral support while allowing relative rotation therebetween.

The invention has been devised particularly, although not solely, for use with an engine means as disclosed in Australian Provisional Patent Application Nos. PQ4601 and PQ4700, the contents of which are incorporated herein by way of reference. Certain embodiments of that engine means have two output shafts which are adapted to rotate in opposite directions and which are operatively connected to an electrodynamic machine for generating electrical current. The electrodynamic machine driven by the engine means can be an electrodynamic machine according to the present invention.

The invention also provides a combination of an engine means and an electric generator adapted to be driven by the engine means, the engine means having a first output shaft and a second output shaft, the electric generator having a first rotor and a second rotor, the first rotor being drivingly connected to the first output shaft of the engine and the second rotor being drivingly connected to the second output shaft of the engine, the first and second rotors being adapted to rotate relative to each other thereby to cause generation of an electric current.

The engine means may comprise two separate engines one of which provides the first output shaft and the other of which provides the second output shaft.

The invention also provides an electrodynamic machine comprising a first outer rotor mounted on a first shaft, a second inner rotor mounted on a second shaft, the second inner rotor being disposed within the first outer rotor and the two rotors being adapted to rotate relative to each other, the first and second shafts being in axial alignment with adjacent ends thereof being interconnected to provide mutual support while allowing relative rotation therebetween and a third shaft drivingly connected to the first third shaft rotor and the second rotor.

Preferably, the third shaft is drivingly connected to the first and second rotors through a gear mechanism comprising first, second and third gears in meshing engagement, the first gear being connected to the first outer rotor for rotation therewith, the second gear being connected to the second shaft for rotation therewith, and the third gear being connected to the third shaft for rotation therewith.

The third gear may comprise a bevel pinion, and the first and second gears may each comprise a bevel gear.

The electrodynamic machine may comprise an electric generator in which relative movement between the two rotors generates an electrical current, and wherein the third shaft comprises a drive shaft whereby rotation of the drive shaft causes rotation of the first rotor and also rotation of the second rotor, with the two rotors rotating relative to each other.

Alternatively, the electrodynamic machine may comprise an electric motor in which relative rotation induced between the two rotors causes rotation of the third shaft.

BRIEF DESCRIPTION OF THE DRAWINGS

The invention will be better understood by reference to the following description of several specific embodiments thereof as shown in the accompanying drawings in which:

FIG. 6 is a schematic elevational view of the electrical generator according to the second embodiment fitted with a speed regulation mechanism;

FIG. 7 is a schematic end elevational view of an epicyclic gear train of the speed regulation mechanism;

FIG. 8 is a schematic view of a further alternative form of speed regulation mechanism;

BEST MODE(S) FOR CARRYING OUT THE INVENTION

Figure 1:
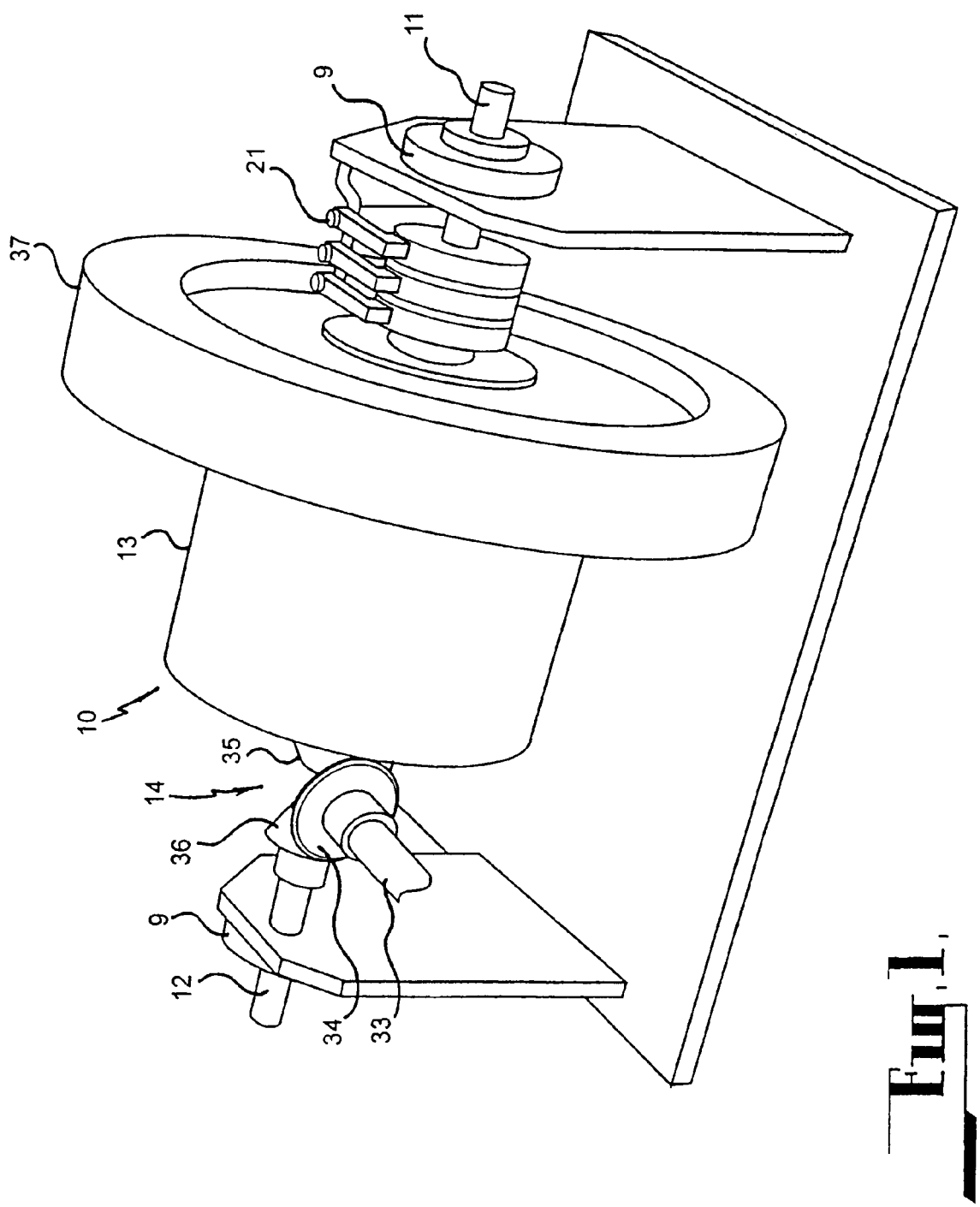
FIG. 1 is a perspective view of an electric generator according to a first embodiment.
Figure 2:
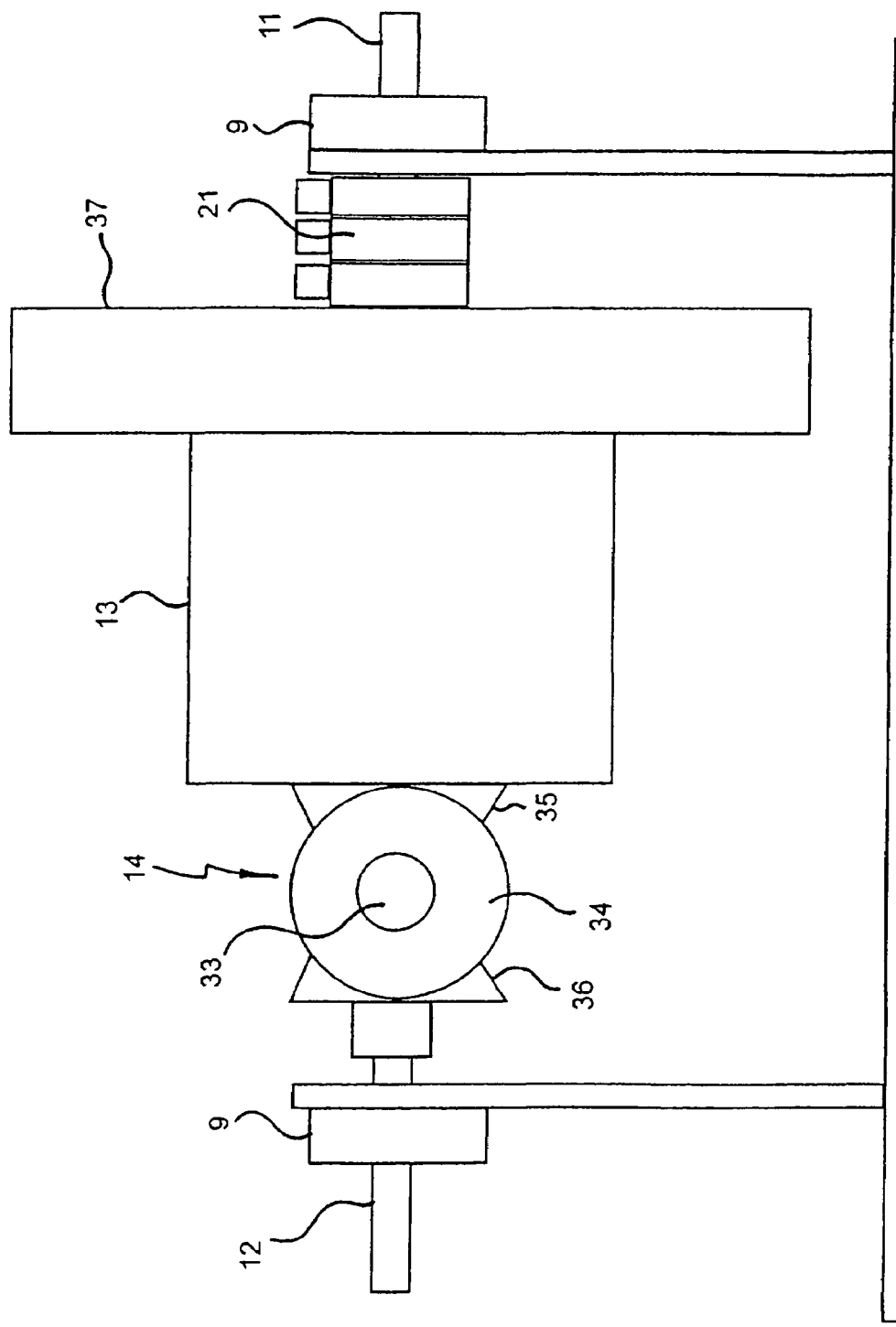
FIG. 2 is a schematic side view of the electric generator.
Figure 3:
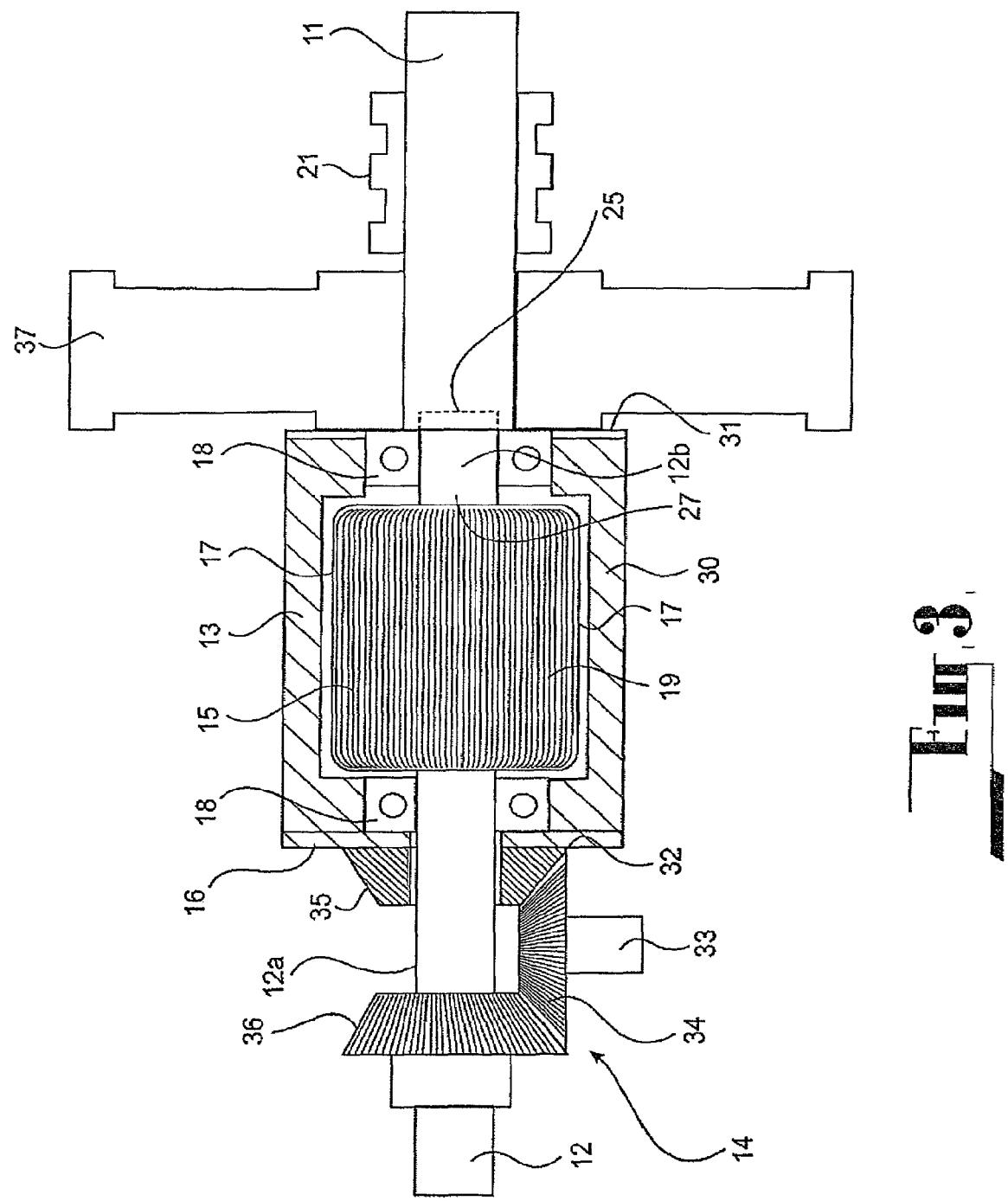
FIG. 3 is a schematic sectional side view of part of the electric generator.

Referring now to FIGS. 1 to 3 of the accompanying drawings, there is shown an electrodynamic machine 10 in the form of an electric generator for generating an electrical current which can be either a DC current or an AC current. Accordingly, the electric generator 10 can function as any appropriate form of generator such as a dynamo or an alternator.

The electric generator 10 comprises a first shaft 11 and a second shaft 12. The two shafts 11, 12 are supported in bearings 9. A first rotor 13 is mounted on the first shaft 11 and a second rotor 15 is mounted on the second shaft 12. The two shafts 11, 12 are connected to a drive means 14 which operates to drive the shafts in opposite directions and thereby cause the first and second rotors 13, 15 to rotate one relative to the other in opposite directions.

In this embodiment, the two rotors 13, 15 are positioned one within the other, with an air gap 17 defined therebetween. Accordingly, the first rotor 13 constitutes an outer rotor and the second rotor 15 constitutes an inner rotor. The first (outer) rotor 13 is rotatably supported on the second (inner) rotor 15 by bearings 18.

The two rotors 13, 15 are adapted to co-operate to generate an electrical current. This is achieved in this embodiment by the outer rotor 13 providing a magnetic field established by way of an electromagnet structure 16 incorporated into the rotor. The inner rotor 15 incorporates a conductor defined by a series of windings 19 which are connected to a slip ring system 21. Accordingly, the construction of the outer rotor 13 is similar to that of a stator in a conventional electric generator, and the construction of the inner rotor 15 is similar to a rotor in a conventional electric generator. In a conventional electric generator, relative rotation between the rotor and the stator generates an electrical current. A similar result is achieved in the present embodiment whereby relative rotation between the two rotors 13, 15 generates an electrical current which is extracted by way of the slip ring system 21 in known manner.

The two shafts 11, 12, are connected together in a manner which provides mutual lateral support while allowing relative rotation therebetween. Specifically, the shaft 11 incorporates a socket 25 which receives a spigot 27 provided on the second shaft 12. The second shaft 12 is actually formed in two sections 12a and 12b, with the inner rotor 15 being positioned between the two sections. The second section 12b provides the spigot 27, as best seen in FIG. 3 of the drawings.

The outer rotor 13 is of hollow construction comprising a cylindrical side wall 30 and two end walls 31, 32. The end wall 32 is detachably mounted on the cylindrical side wall 30 to facilitate removal for access to the interior region defined within the hollow outer rotor 13 to facilitate installation and removal of the inner rotor 15.

In operation of the electric generator, rotation of the two shafts 11, 12 in opposite directions causes relative rotation between the rotors 13, 15 also in opposite directions. The relative rotation between the rotors 13, 15 generates an electrical current which is delivered via the slip ring system 21.

The drive means 14 in this embodiment comprises an input drive shaft 33 which is drivingly connected to a motor (not shown). A drive pinion 34 is mounted on the input drive shaft 33 for rotation therewith. The drive pinion 34 is in meshing engagement with a first driven pinion 35 and a second driven pinion 36. The second driven pinion 36 is mounted on the second drive shaft 12 for transmission of rotational torque from the input drive shaft 33 to the second drive shaft 12. The first driven pinion 35 is drivingly connected to the outer rotor 13. More particularly, the first driven pinion 35 is mounted on the end wall 32 of the outer rotor 13 and is rigidly secured thereto by suitable fixings or by welding. The first driven pinion 35 is not connected to the second shaft 12 but merely surrounds the second shaft without being drivingly connected thereto. This is accomplished by the second shaft 12 passing freely through a central passage within the first driven pinion 35.

With this arrangement, the input driving shaft 33 is drivingly connected to the first and second rotors 13, 15 so as to cause relative rotation therebetween in opposite directions. Specifically, the input drive shaft 33 is drivingly connected to the first rotor 13 through the drive pinion 34 and the first driven pinion 35 which is in meshing engagement with the drive pinion 34 and which is drivingly connected to the first rotor 13. Similarly, the driving input shaft 33 is drivingly connected to the second rotor 15 through the drive pinion 34 which is drivingly connected to the second driven pinion 36 which is in turn drivingly connected to the second drive shaft 12 which is in turn drivingly connected to the inner rotor 15.

In this embodiment, a fly wheel 37 is mounted on the first shaft 11 provided for the purpose of maintaining reasonably constant rotational speeds for the rotors 13, 15 in spite of any minor variations in the input power delivered by the motor (not shown) driving the drive shaft 33.

The slip ring system 21 is conveniently located on the first shaft 11 adjacent the fly wheel 37.

The drive means 14 has several advantages, one of which is that it ensures that the rotors 13, 15 rotate at the same angular velocity (although in opposite directions) by virtue of the drive pinion 34 being in meshing engagement with both of the driven pinions 35, 36. The drive means 14 provide the additional benefit that the two shafts 11, 12 undergo rotation and can be used to deliver rotational torque for other purposes.

In an alternative arrangement, the engine (not shown) for driving the electric generator can be drivingly connected to the second shaft 12, with the shaft 33 as well as the shaft 11 both in functioning as output shafts for delivering rotational torque for other purposes.

Figure 4:
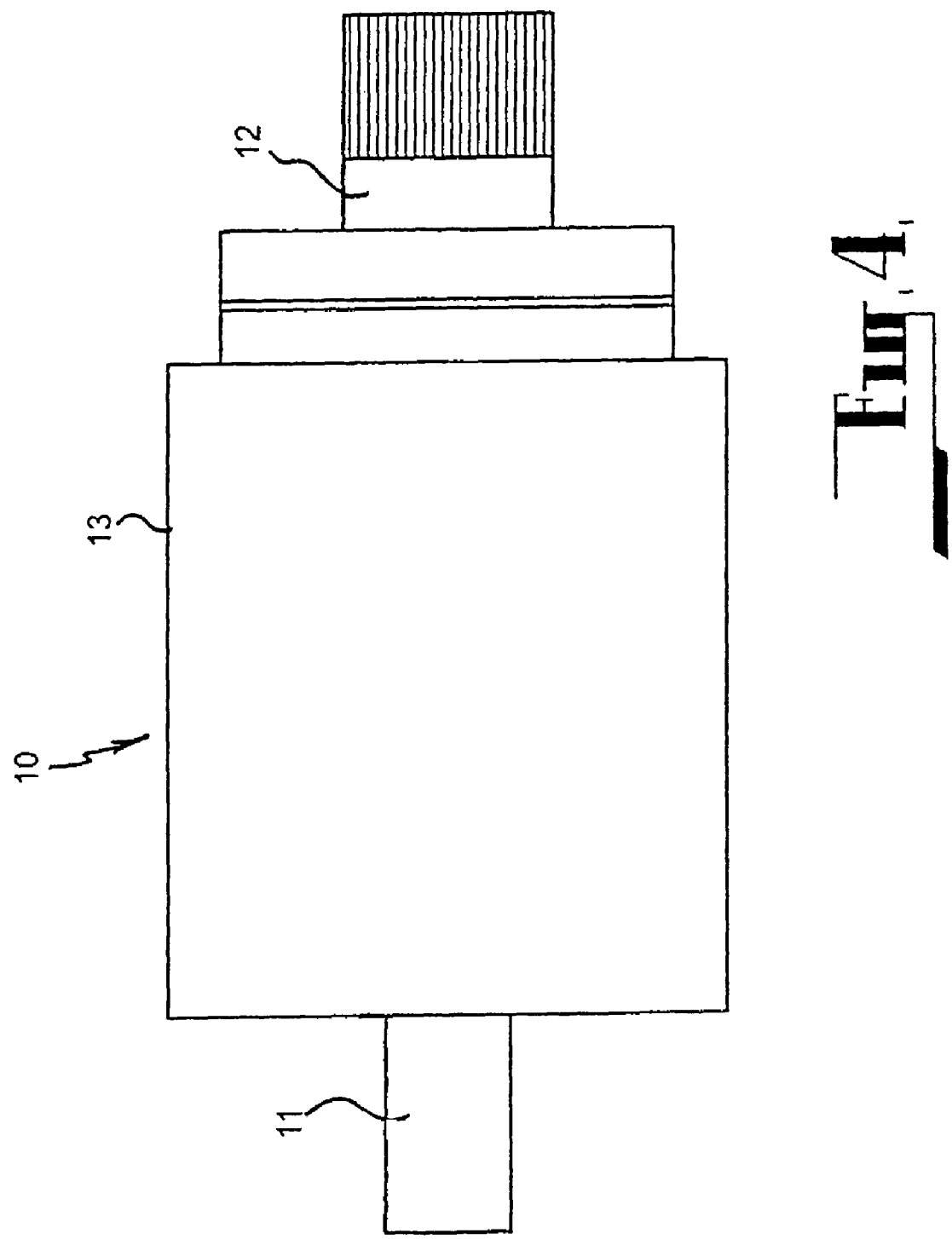
FIG. 4 is a schematic side view of an electric generator according to a second embodiment.
Figure 5:
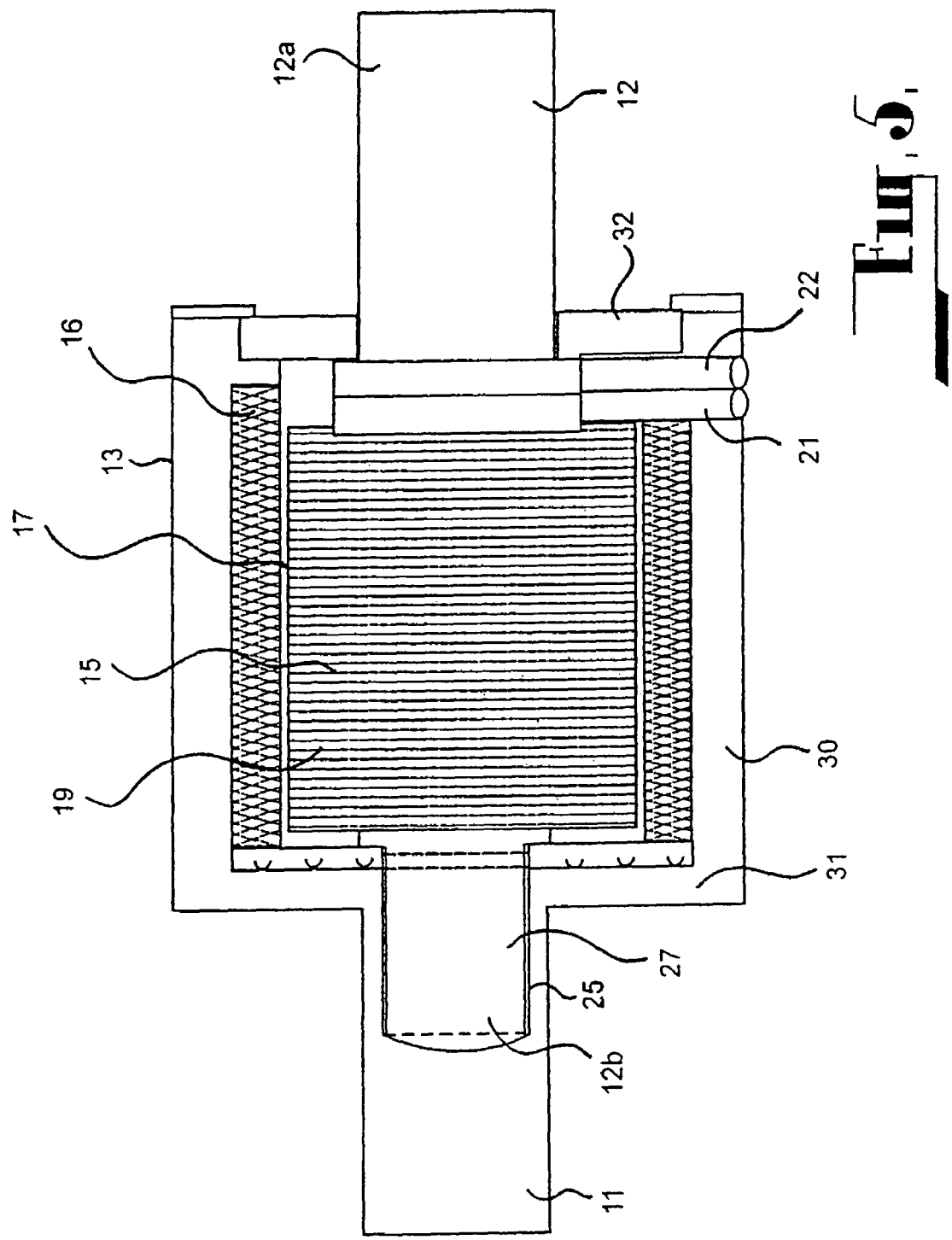
FIG. 5 is a schematic sectional view of the electric generator of FIG. 4.

Referring now to FIGS. 4 and 5, the electric generator 10 according to the second embodiment comprises a first shaft 11 and a second shaft 12. A first rotor 13 is mounted on the first shaft 11 and the second rotor 15 is mounted on the second shaft 12. In this embodiment, each shaft 11, 12 is adapted to be connected to a respective drive means (not shown) such as an engine. The electric generator 10 according to this embodiment operates in a similar fashion to the electric generator of the first embodiment in the sense that rotational torque is applied to the first shaft 11 and the second shaft 12 in opposite directions so as to cause the first and second rotors 13, 15 to also rotate one relative to the other in opposite directions.

There may be advantages in ensuring that the two shafts 11, 12 rotate at the same angular velocity (although in opposite directions). For this purpose, a speed regulation means may be used in association with the electric generator. Such an arrangement is utilised in the electric generator 10 according to the third embodiment as shown in FIGS. 6 and 7. The electric generator 10 of this embodiment incorporates a speed regulation means 40 comprising a gear mechanism 41 in the form of an epicyclic gear train 45 having an internal gear 47 mounted on or formed integrally with the outer rotor 13 and a sun gear 49 mounted on the second shaft 12, with a series of planetary gears 51 in meshing engagement between the internal gear 47 and the sun gear 49. Because the internal gear 47 is mounted on the outer rotor 13, which is directly connected to the first shaft 11, the epicyclic gear train 45 provides a geared connection between the first shaft 11 and the second shaft 12, thereby ensuring that the two drive shafts rotate at a common angular velocity (although of course in opposite directions).

FIG. 8 of the drawings illustrates a further speed control means 40 which is similar to the speed control means illustrated in FIGS. 6 and 7 with the exception that only one planetary gear is utilised.

It is to be appreciated that any other suitable gear mechanism may be utilised to couple the two shafts 11, 12 together to ensure that they are caused to rotate at a common angular velocity (although in different directions).

Figure 9:
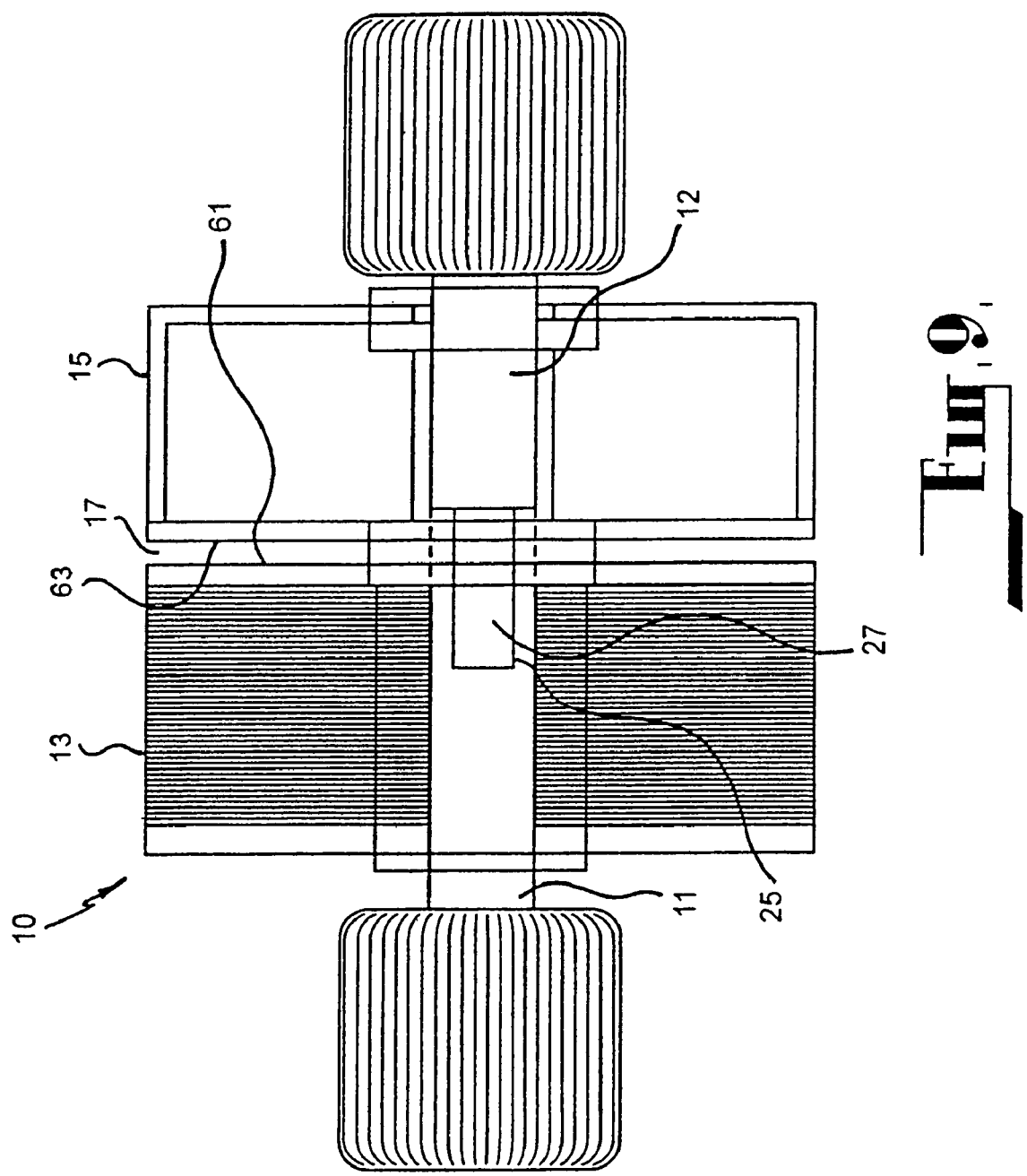
FIG. 9 is a schematic side elevational view of an electric generator according to a further embodiment.
Figure 11:
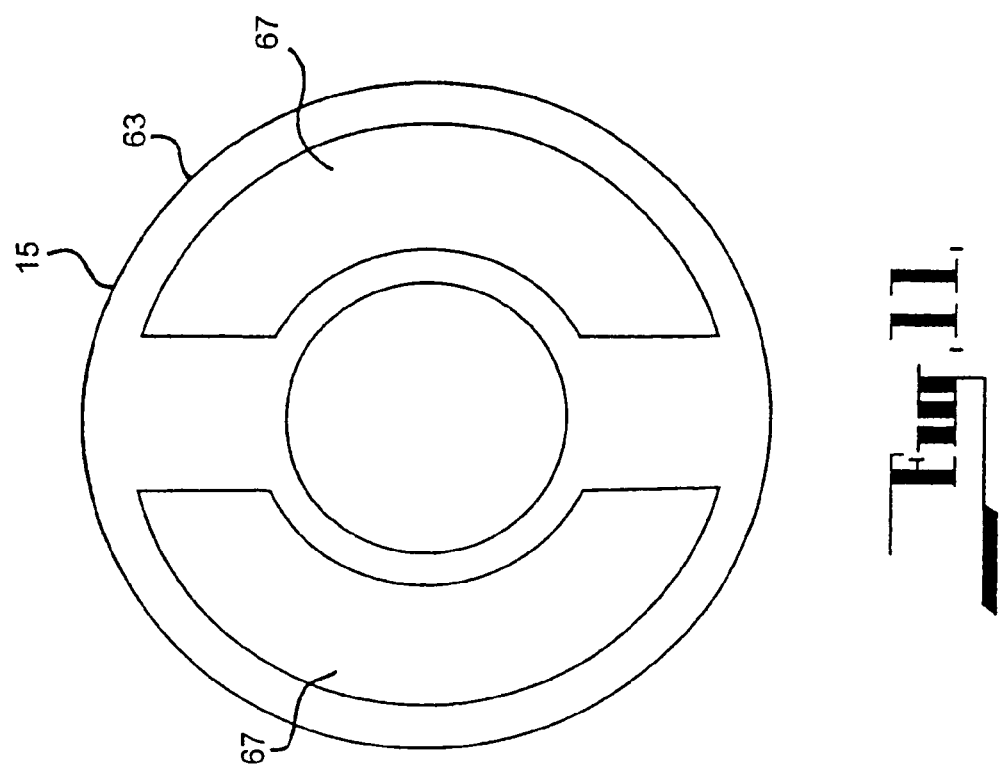
FIG. 11 is an end view of an end face of the other rotor of the electric generator according to the embodiment of FIG. 9.
Figure 10:
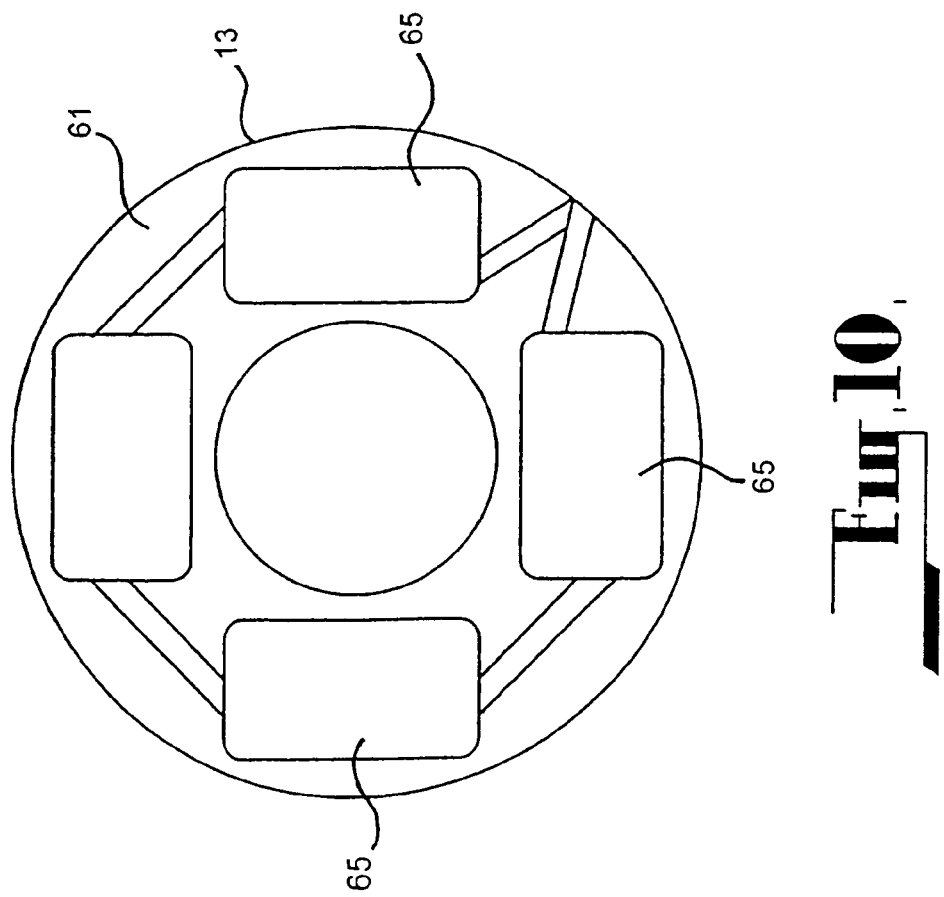
FIG. 10 is a view of an end face of one of the rotors of the electric generator according to the embodiment of FIG. 9.

Referring now to FIGS. 9, 10 and 11, there is shown an electric generator 10 according to a further embodiment. The electric generator 10 according to this embodiment comprises a first shaft 11 on which a first rotor 13 is mounted, and a second shaft 12 on which a second rotor 15 is mounted. In this embodiment, the two rotors 13, 15 are not mounted one within the other as was the case with the first embodiment but rather are positioned axially in a side-by-side relationship with an air gap 17 defined therebetween.

As was the case with the earlier embodiments, the two shafts 11, 12 are connected one to another in a manner which provides mutual lateral support while allowing relative rotation therebetween. This is achieved by the provision of a socket 25 in one of the shafts receiving a spigot 27 on the other of the shafts.

The first rotor 13 has an end face 61 which confronts the air gap 17 and the second rotor 15 has an end face 63 which also confronts the air gap 17. The end face 61 incorporates winding coils 65 and the end face 63 incorporates magnetic iron 67, the arrangement being such that relative rotation between the two rotors causes interaction between the winding coils and the magnetic iron so as to generate an electrical current.

Figure 12:
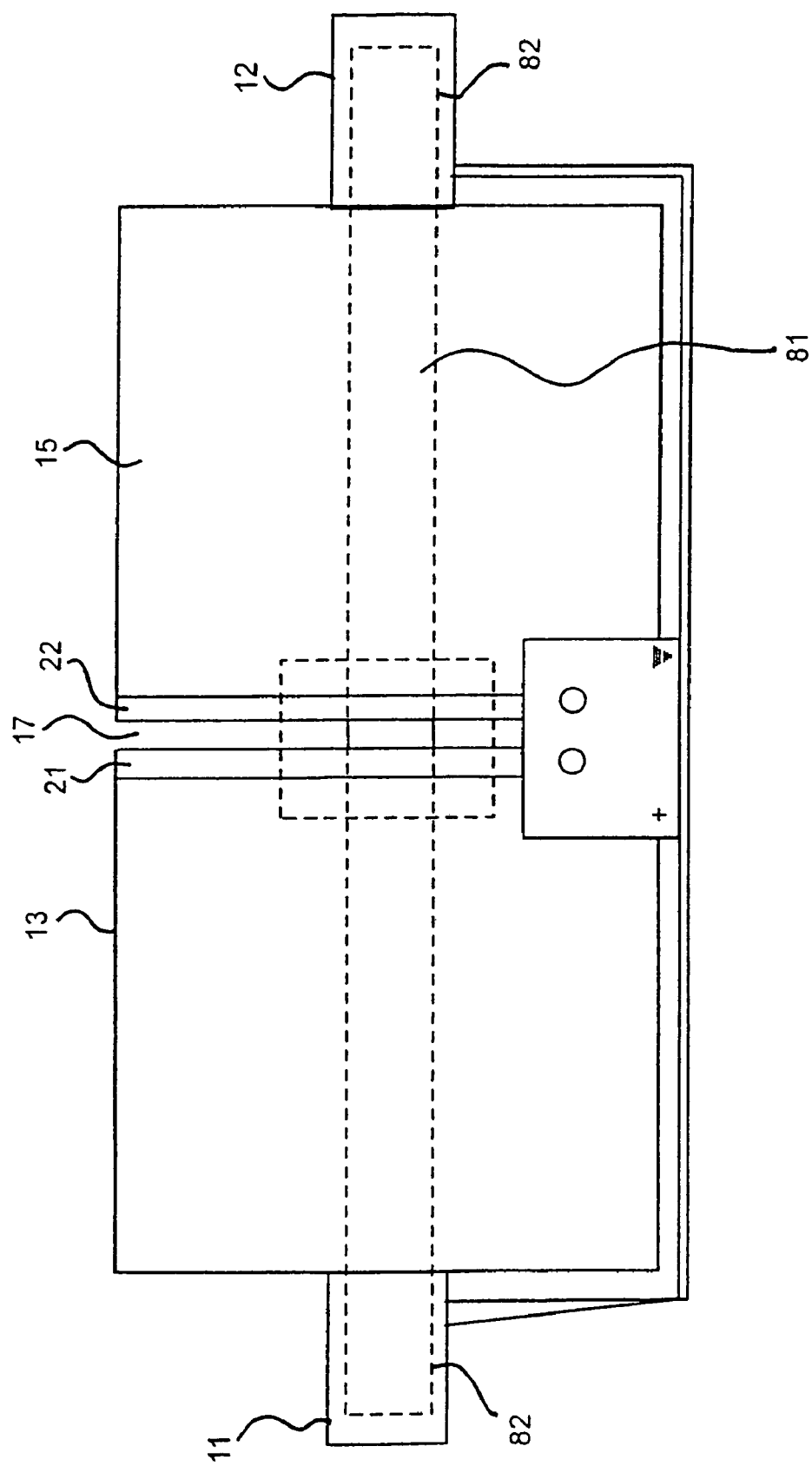
FIG. 12 is a schematic side view of an electric generator according to a still further embodiment.
Figure 13:
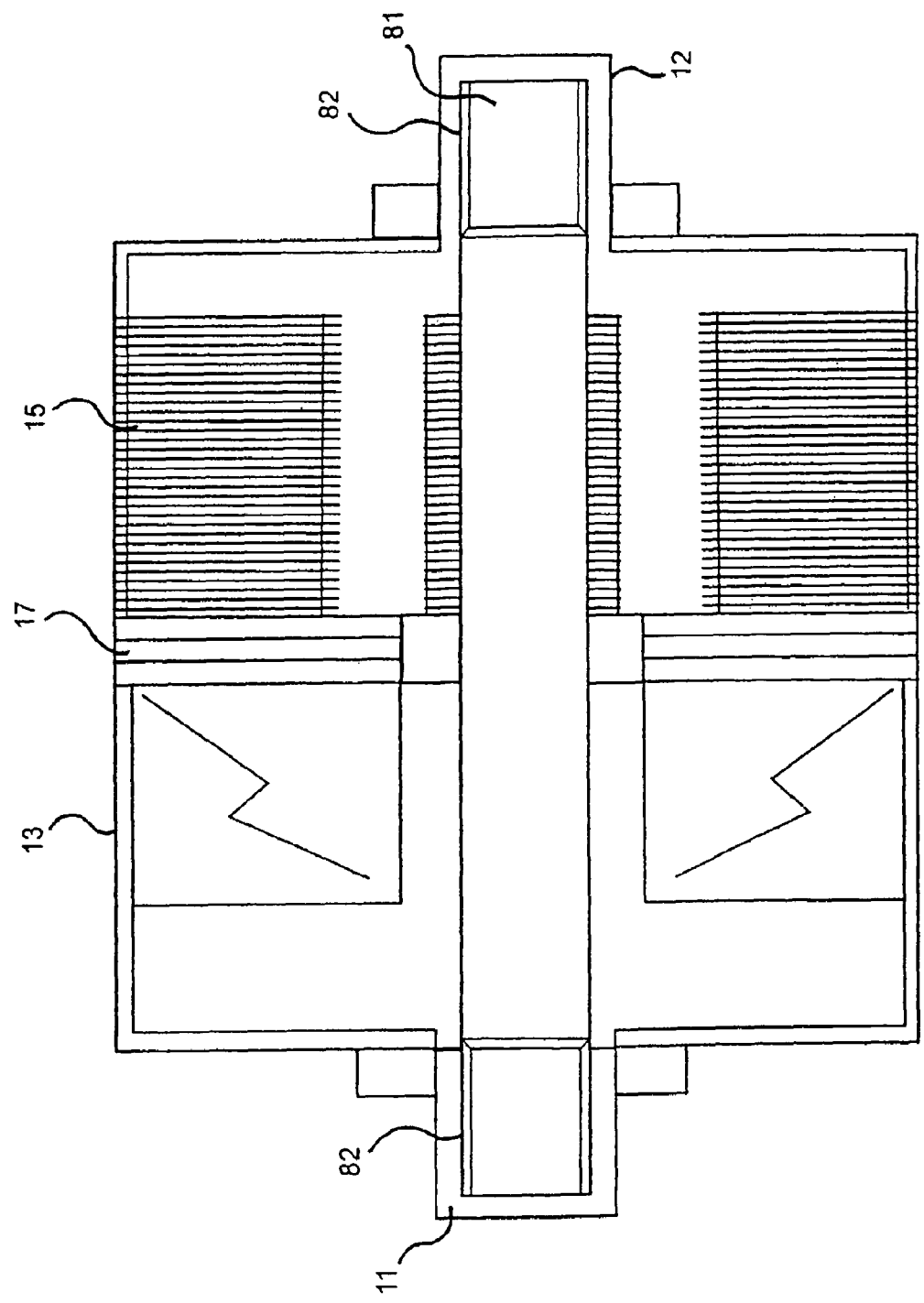
FIG. 13 is a sectional view of the electric generator of FIG. 12.

Referring now to FIGS. 12 and 13 of the accompanying drawings, there is shown an electric generator according to a still further embodiment. The electric generator according to this embodiment is somewhat similar to the electric generator of the previous embodiment inasmuch as the two rotors 13, 15, are mounted axially with respect to each other with an air gap 17 defined therebetween. In this embodiment, however, the two rotors 13, 15 are mounted on a common axle shaft 81. The ends of the axle shaft 81 are received in sockets 82 provided in the corresponding ends of the first drive shaft 11 and the second drive shafts 12. This arrangement provides mutual support for the two shafts 11, 12 through the axle shaft 81 while allowing relative rotation between those two shafts and, of course, the two rotors 13, 15. The first shaft 11 is of course drivingly connected to the first rotor 13 and the second shaft 12 is drivingly connected to the second rotor 15. A slip ring system 21 is provided for extracting current generated by relative rotation between the two rotors 13, 15.

Figure 14:
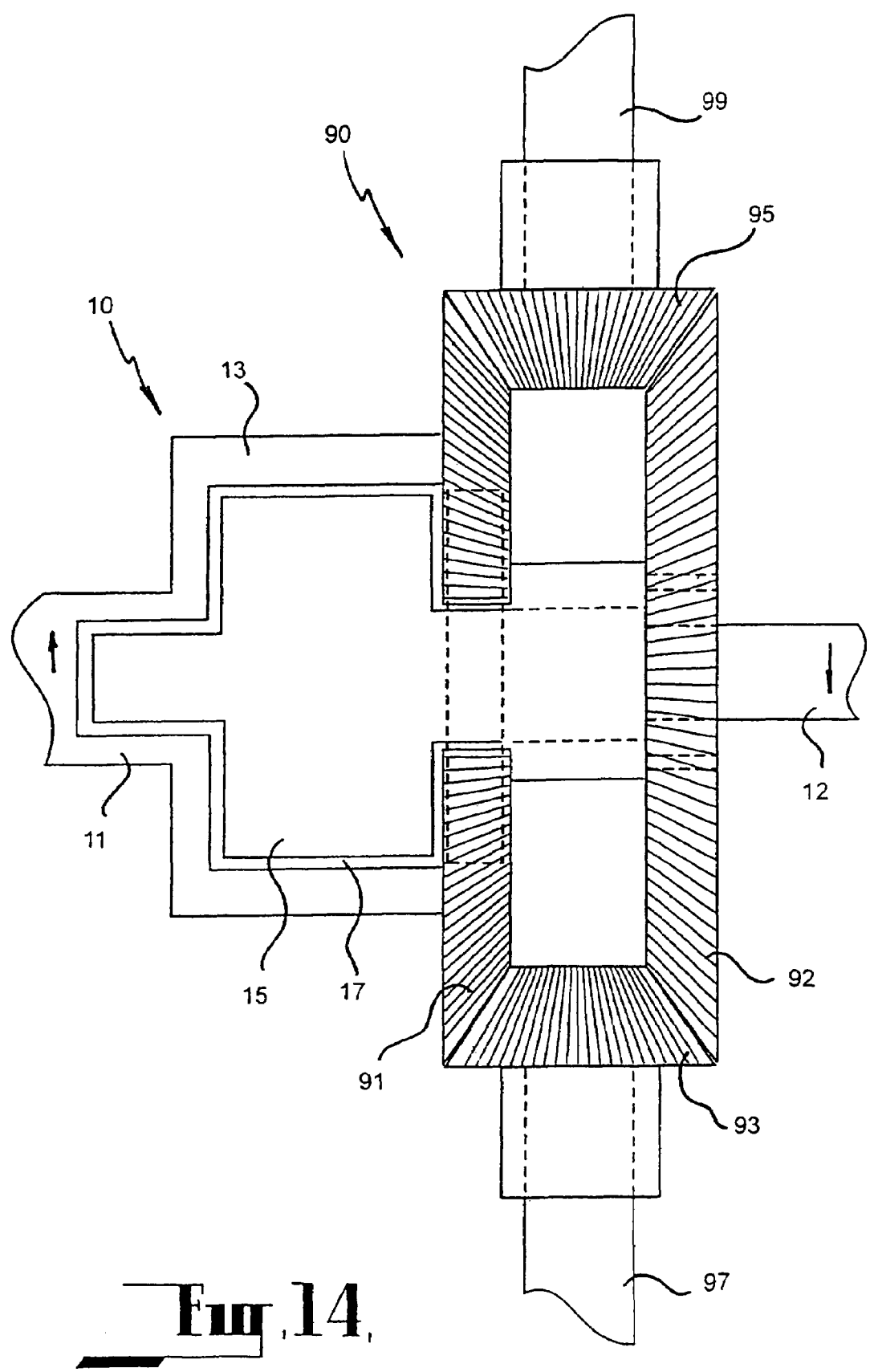
FIG. 14 is a schematic view of a gear mechanism for use with an engine having two output shafts for operating the electric generator.
Figure 15:
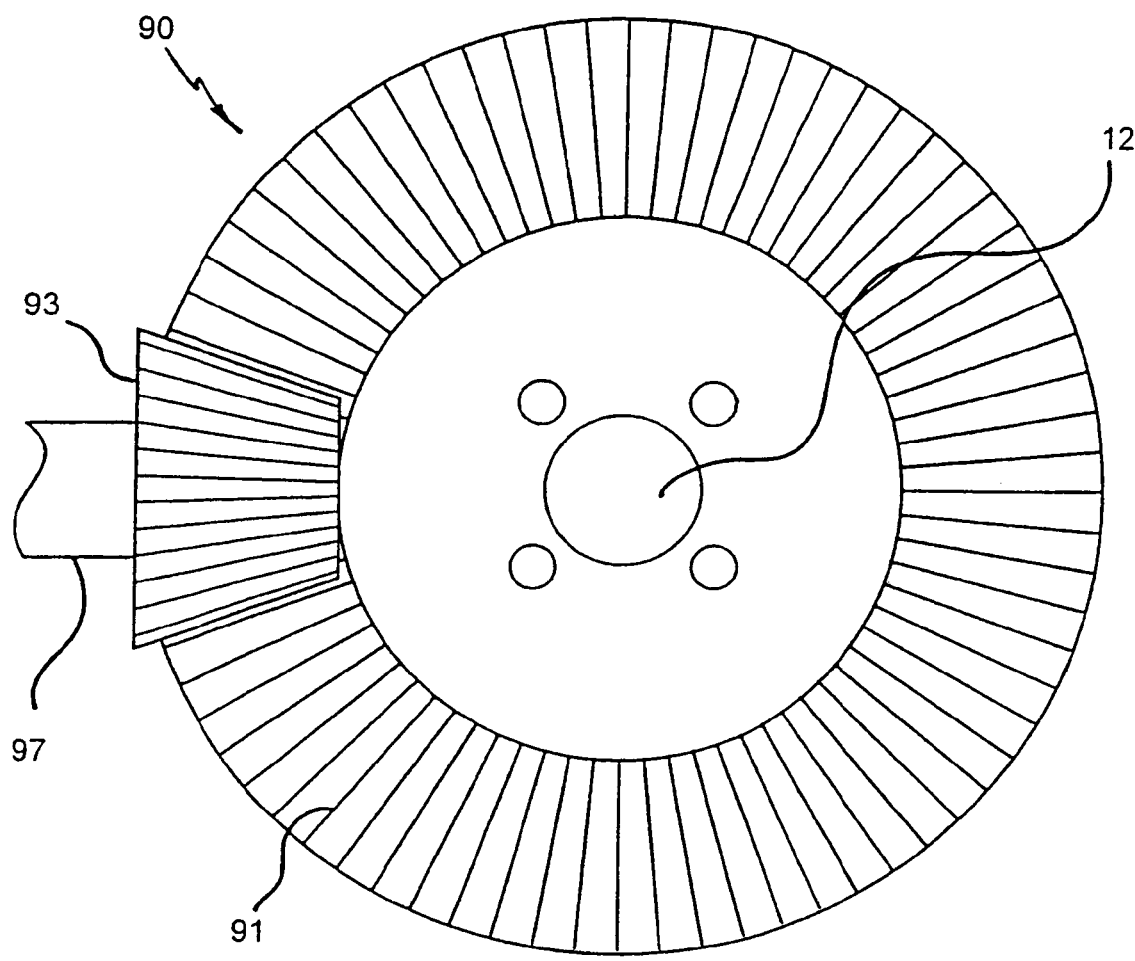
FIG. 15 is a schematic view of part of the gear mechanism.

Referring now to FIGS. 14 and 15, there is shown an electric generator 10 adapted to be driven by two engines (not shown), one engine having output shaft 97 and the other engine having output shaft 99. The two output shafts 97, 99 are drivingly connected to the two shafts 11, 12 of the electric generator 10 through a gear mechanism 90. The gear mechanism 90 comprises a first bevel pinion 93 mounted on output shaft 97 and a second bevel pinion 95 mounted on the output shaft 99. The two bevel pinions 93, 95 are in meshing engagement with a first bevel gear 91 and a second bevel gear 92. The two bevel gears 91, 92 are in spaced apart relationship and rotate about a common axis. The first bevel gear 91 is mounted on the outer rotor 13 and so is drivingly connected to the first shaft 11. The second bevel gear 92 is drivingly connected to the second shaft 12 by being mounted thereon. The meshing engagement between the pinions 93, 95 and the gears 91, 92 ensures that the two rotors 13, 15 rotate at the same angular velocity but in opposite directions.

With this arrangement, rotational torque delivered through output shafts 97, 99 is transmitted through the gear mechanism 90 to the electric generator 10, causing the outer rotor 13 and the inner rotor 15 to rotate in opposite directions in a similar fashion to the first embodiment. This arrangement has the additional benefit that the two shafts 11, 12 undergo rotation and can be used to deliver rotational torque for other drive purposes. In particular a fly-wheel can be mounted on one of the two shafts 11, 12.

Figure 16:
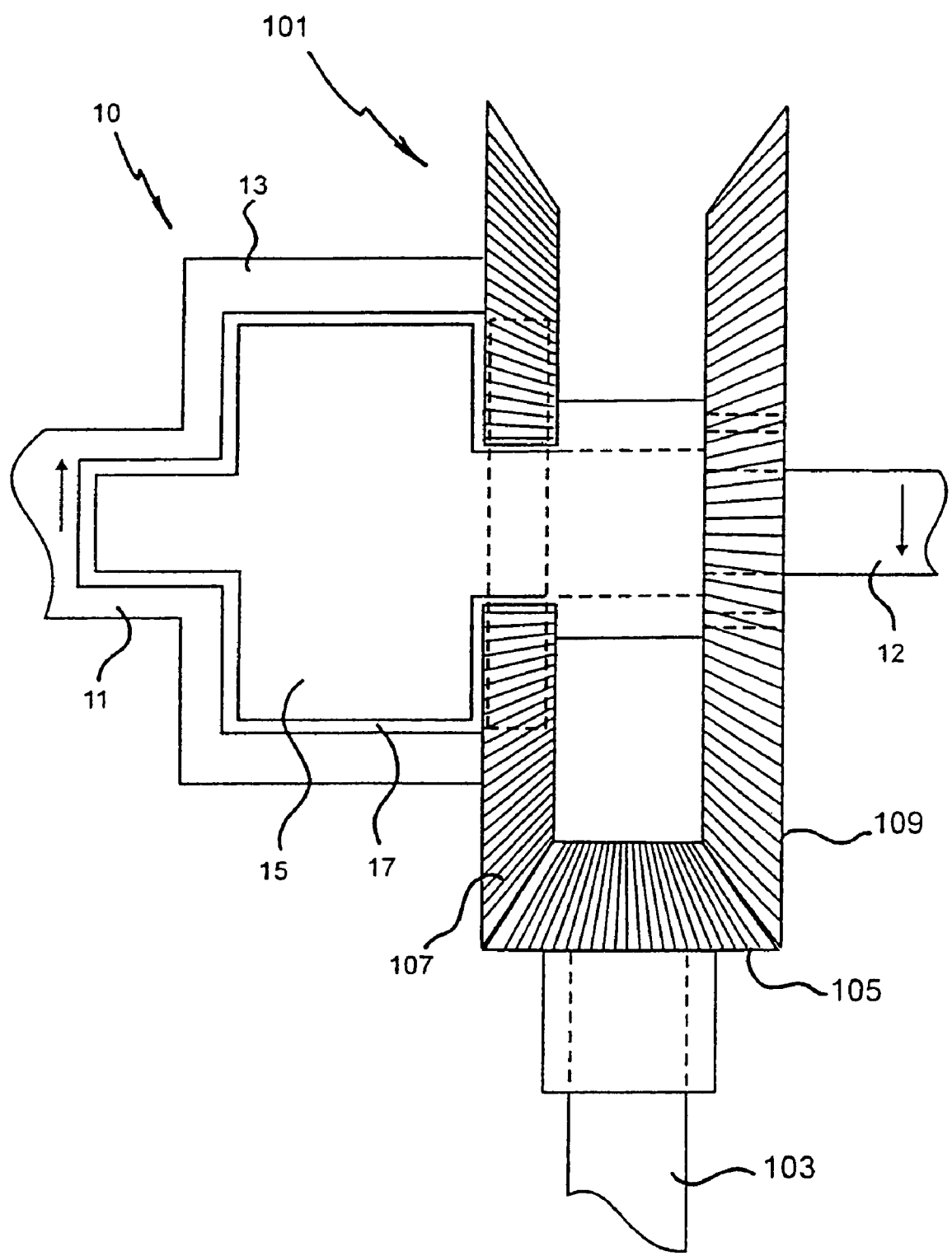
FIG. 16 is a schematic view of a gear mechanism for use with an engine having one output shaft for operating the electric generator.

Referring now to FIG. 16 of the drawings, there is shown a gear mechanism 101 through which an electric generator 10 according to a further embodiment can be driven from a single output shaft 103 of an engine (not shown). The gear mechanism 101 comprises a bevel pinion 105 mounted on the output shaft 103. The bevel pinion 105 is in meshing engagement with a first bevel gear 107 and a second bevel gear 109. The two bevel gears 107, 109 are in spaced relationship and rotate about a common axis. The first bevel gear 107 is mounted on the outer rotor 13 of the electric generator 10 and so is drivingly connected to the first shaft 11. The second bevel gear 109 is drivingly connected to the second shaft 12 by being mounted thereon. The meshing engagement between the pinion 105 and the two bevel gears 107, 109 ensures that the two rotors 13, 15 rotate at the same angular velocity but in opposite directions.

With this arrangement, rotational torque delivered by the engine through the output shaft 103 is transmitted through the gear mechanism 101 to the electric generator 10, causing the outer rotor 13 and the inner rotor 15 to rotate at the same angular velocity but in opposite directions. This arrangement has the additional benefit that the two shafts 11, 12 undergo rotation and can be used to deliver rotational torque for drive purposes. A fly-wheel (not shown) can be mounted on one of the two shafts 11, 12.

From the foregoing, it is evident that the present invention provides a simple yet highly effective electrodynamic machine which incorporates two rotors rotating one relative to the other.

While the embodiments have been described in relation to the electrodynamic machine functioning as an electric generator, it will be appreciated that the electrodynamic machine may function as an electric motor whereby electrical energy delivered to the electrodynamic machine is converted into mechanical energy in the form of rotational torque delivered to the drive shafts of the two rotors.

It should be appreciated that the scope of the invention is not limited to the scope of the embodiments described.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. An electrodynamic machine comprising:
   an inner rotor;
   an outer rotor disposed around the inner rotor for interaction therewith, the inner rotor being mounted on a second shaft for rotation therewith, the outer rotor being mounted on a first shaft for rotation about the inner rotor; and
   a gear means for rotating the outer and inner rotors relative to each other, the gear means including:
   a) first and second driven pinions, the first driven pinion being connected directly to the outer rotor to effect rotation thereof, and the second driven pinion being connected directly to the second shaft for rotation therewith to effect rotation of the inner rotor, and
   b) a drive pinion in meshing engagement between the first and second driven pinions, the drive pinion being connected directly to a drive shaft, wherein the second shaft and the drive shaft are each arranged and configured to receive rotational drive from an external source to cause rotation of the second driven pinion,
   wherein input torque applied to the second shaft causes rotation of the second driven pinion that is transmitted to the first driven pinion through the drive pinion, whereby an output torque is provided to the first shaft and the drive shaft for driving an external load.

2. The electrodynamic machine according to claim 1 wherein the outer rotor is rotatably supported on the second shaft by bearings.

3. The electrodynamic machine according to claim 2 wherein the inner rotor is accommodated on the second shaft between the bearings.

4. The electrodynamic machine according to claim 1 wherein the first driven pinion is mounted on a first end wall of the outer rotor.

5. The electrodynamic machine according to claim 4 wherein the outer rotor is of hollow construction comprising a cylindrical side wall, the first end wall being at one end of the cylindrical side wall and a second end wall being at the other end of the cylindrical side wall.

6. The electrodynamic machine according to claim 5 wherein the first end wall is detachably mounted on the cylindrical side wall to provide access to the interior of the outer rotor.

7. The electrodynamic machine according to claim 1 wherein the outer and inner rotors are adapted to rotate in opposite directions.

8. The electrodynamic machine according to claim 1 wherein the electrodynamic machine is an electric generator and wherein there is an air gap defined between the outer and inner rotors, whereby interaction between the outer and inner rotors generates an electrical current upon relative movement therebetween.

9. The electrodynamic machine according to claim 8 wherein one of the outer and inner rotors provides a magnetic field and the other of the outer and inner rotors provides a conductor in which the electric current is generated upon movement of the conductor through the magnetic field.

10. The electrodynamic machine according to claim 1 wherein the second shaft further comprises a first section adapted to receive rotational movement of the inner rotor.

11. The electrodynamic machine according to claim 10 further comprising a flywheel.

12. The electrodynamic machine according to claim 11 wherein the flywheel is mounted on the first shaft for rotation therewith.

13. An electrodynamic machine comprising:
    an inner rotor;
    an outer rotor disposed around the inner rotor for interaction therewith, the inner rotor being mounted on a second shaft for rotation therewith, the outer rotor being mounted on a first shaft for rotation about the inner rotor; and
    a gear means for rotating the outer and inner rotors relative to each other, the gear means comprising first and second driven pinions and a drive pinion being in meshing engagement with the first and second driven pinions, the first driven pinion being connected directly to the outer rotor to effect rotation thereof, the second driven pinion being connected directly to the second shaft for rotation therewith to effect rotation of the inner rotor,
    wherein the drive pinion is mounted on a drive shaft for rotation therewith,
    wherein rotation of the drive pinion is transmitted to the first and second driven pinions for at least delivering an output torque to the first shaft and the second shaft for driving an external load.

14. The electrodynamic machine according to claim 13 wherein the second shaft further comprises a first section adapted to receive rotational movement of the inner rotor.

15. The electrodynamic machine according to claim 14 further comprising a flywheel.

16. The electrodynamic machine according to claim 15 wherein the flywheel is mounted on the first shaft for rotation therewith.

17. The electrodynamic machine according to claim 13 wherein the outer rotor is rotatably supported on the second shaft by bearings.

18. The electrodynamic machine according to claim 17 wherein the inner rotor is accommodated on the second shaft between the bearings.

19. The electrodynamic machine according to claim 18 wherein the first driven pinion is mounted on a first end wall of the outer rotor.

20. The electrodynamic machine according to claim 19 wherein the outer rotor is of hollow construction comprising a cylindrical side wall, the first end wall being at one end of the cylindrical side wall and a second end wall being at the other end of the cylindrical side wall.

21. The electrodynamic machine according to claim 20 wherein the first end wall is detachably mounted on the cylindrical side wall to provide access to the interior of the outer rotor.

22. The electrodynamic machine according to claim 13 wherein the outer and inner rotors are adapted to rotate in opposite directions.

23. The electrodynamic machine according to claim 13 wherein the electrodynamic machine is an electric generator and wherein there is an air gap defined between the outer and inner rotors, whereby interaction between the outer and inner rotors generates an electrical current upon relative movement therebetween.

24. The electrodynamic machine according to claim 23 wherein one of the outer and inner rotors provides a magnetic field and the other of the outer and inner rotors provides a conductor in which the electric current is generated upon movement of the conductor through the magnetic field.

* * * * *